United States Patent
Braun et al.

(10) Patent No.: US 10,876,427 B2
(45) Date of Patent: Dec. 29, 2020

(54) TURBINE AND TURBOCHARGER

(71) Applicant: MAN ENERGY SOLUTIONS SE, Augsburg (DE)

(72) Inventors: Steffen Braun, Augsburg (DE); Jiří Klíma, Namest nad Oslavou (CZ); Vladimir Hort, Velká Bites (CZ); Tobias Weisbrod, Augsburg (DE); Bernd Haas, Neusäß (DE); Johannes Niebuhr, Augsburg (DE)

(73) Assignee: MAN Energy Solutions SE, Augsburg (DE)

( * ) Notice: Subject to any disclaimer, the term of this patent is extended or adjusted under 35 U.S.C. 154(b) by 102 days.

(21) Appl. No.: 16/197,114

(22) Filed: Nov. 20, 2018

(65) Prior Publication Data
US 2019/0153898 A1 May 23, 2019

(30) Foreign Application Priority Data
Nov. 22, 2017 (DE) .......................... 10 2017 127 628

(51) Int. Cl.
  *F01D 25/24* (2006.01)
  *F01D 9/04* (2006.01)
  *F01D 25/16* (2006.01)
  *F02C 6/12* (2006.01)

(52) U.S. Cl.
  CPC ........... *F01D 25/243* (2013.01); *F01D 9/045* (2013.01); *F01D 25/16* (2013.01); *F02C 6/12* (2013.01); *F05D 2220/40* (2013.01)

(58) Field of Classification Search
  None
  See application file for complete search history.

(56) References Cited

U.S. PATENT DOCUMENTS

| | | | |
|---|---|---|---|
| 6,928,816 B2 * | 8/2005 | Leavesley | F01D 17/14 415/158 |
| 7,581,394 B2 * | 9/2009 | Perrin | F01D 17/143 415/157 |
| 8,057,102 B2 * | 11/2011 | Becker | F03D 80/70 384/428 |
| 9,732,633 B2 * | 8/2017 | Annati | F01D 25/26 |
| 9,810,238 B2 * | 11/2017 | Annati | F04D 29/4226 |
| 2010/0266430 A1 * | 10/2010 | Shimizu | F02B 37/10 417/423.8 |
| 2013/0243581 A1 * | 9/2013 | Lotterman | F01D 25/24 415/170.1 |
| 2016/0265539 A1 * | 9/2016 | Annati | F04D 17/10 |
| 2017/0009810 A1 * | 1/2017 | Futae | F02B 39/14 |
| 2017/0074278 A1 * | 3/2017 | Watanabe | F04D 17/10 |
| 2017/0211616 A1 * | 7/2017 | Kojima | F16C 17/10 |
| 2017/0350408 A1 * | 12/2017 | Sakurai | F02B 39/00 |
| 2018/0087531 A1 * | 3/2018 | Weisbrod | F01D 25/243 |
| 2018/0112623 A1 * | 4/2018 | Hollweck | F02F 1/4264 |
| 2018/0172021 A1 * | 6/2018 | Weisbrod | F02C 6/12 |

(Continued)

Primary Examiner — Michael Lebentritt
(74) Attorney, Agent, or Firm — Cozen O'Connor

(57) ABSTRACT

A turbine for a turbocharger, for expanding a medium, with a turbine rotor, having a turbine housing with an insert piece, which runs radially outside of the adjoining blades of the turbine rotor. The insert piece at an upstream end, includes a first flange and a second flange at a downstream end. The insert piece, in a middle section, which extends between the first flange and the second flange, has an approximately constant thickness.

11 Claims, 2 Drawing Sheets

(56) References Cited

U.S. PATENT DOCUMENTS

| | | | |
|---|---|---|---|
| 2018/0223871 A1* | 8/2018 | Makino | F02B 39/00 |
| 2018/0230846 A1* | 8/2018 | Kawano | F02B 39/00 |
| 2019/0024670 A1* | 1/2019 | Tanabe | F02B 37/00 |
| 2019/0063445 A1* | 2/2019 | Nishimura | F04D 29/4206 |
| 2019/0072002 A1* | 3/2019 | Bartholoma | F01D 11/003 |
| 2019/0301358 A1* | 10/2019 | Bozek | F02B 37/00 |
| 2019/0301366 A1* | 10/2019 | Weisbrod | G06T 7/277 |
| 2019/0316516 A1* | 10/2019 | Arai | F01D 25/145 |

* cited by examiner

TURBINE AND TURBOCHARGER

BACKGROUND OF THE INVENTION

1. Field of the Invention

The invention relates to a turbine and to a turbocharger having a turbine.

2. Description of the Related Art

FIG. 1 shows the fundamental construction of a turbocharger 1 known from the prior art.

The turbocharger 1 comprises a turbine 2 for expanding a first medium, in particular for expanding exhaust gas of an internal combustion engine. Turbocharger 1 furthermore comprises a compressor 3 for compressing a second medium, in particular charge air, namely utilising energy extracted in the turbine 2 during the expansion of the first medium.

The turbine 2 comprises a turbine housing 4 and a turbine rotor 5. The compressor 3 comprises a compressor housing 6 and a compressor rotor 7. The compressor rotor 7 is coupled to the turbine rotor 5 via a shaft 8, which is mounted in a bearing housing 9. The bearing housing 9 is positioned between the turbine housing 4 and the compressor housing 5 and is connected both to the turbine housing 4 and to the compressor housing 5. Furthermore, FIG. 1 shows a compressor-side silencer 10.

The turbine housing 4 of the turbine 2 comprises an inflow housing 11 and an outflow housing 12. By way of the inflow housing 11, the first medium to be expanded in the region of the turbine 2 can be fed to the turbine rotor 5. By way of the outflow housing 12 or by way an exhaust pipe which is not shown, first medium expanded in the region of the turbine rotor 5 flows away from the turbine.

In addition to the inflow housing 11 and the outflow housing 12, the turbine housing 4 comprises an insert piece 13, wherein the insert piece 13 runs in particular in the region of the inflow housing 11, namely adjacently to the turbine rotor 5 adjoining moving blades 14 of the turbine rotor 5 radially outside. The turbine housing 4, furthermore, comprises a nozzle ring 15. The nozzle ring 15 is also referred to as turbine guide apparatus.

During the operation, a failure of the turbine 2 can occur. During a failure, fragments can be detached from the turbine rotor 5 and strike through the turbine housing 4. This has to be avoided. For this reason it is already known from practice to equip a turbine 2 of a turbocharger 1 with a burst protection, for example a housing.

SUMMARY OF THE INVENTION

There is a need for improving the burst protection through turbine-internal measures, in order for example to be able to embody a housing with a thinner wall thickness to realise cost and weight advantages.

Starting out from this, one aspect of the invention is based on creating a new type of turbine and a new type of turbocharger. According to one aspect of the invention, the insert piece, in a middle section, which extends between the first flange and the second flange or in the region of the turbine, has an approximately constant thickness.

In the event of a failure of the turbine, the insert piece of the turbine according to one aspect of the invention allows intercepting and removing kinetic energy of fragments of the turbine rotor in a defined manner so that it is possible to carry out other measures for the containment safety, such as for example a housing, more easily while realising cost and weight advantages and relieving adjoining structures.

The thickness of a middle section of the insert piece is defined by the radial distance between a radially inner flow-conducting wall of the insert piece and a radially outer wall of the insert piece. The approximately constant thickness changes by a maximum of ±10% based on a mean thickness of the middle section. The mean thickness of the middle section preferentially amounts to between 3% and 9% of a fit diameter of the insert piece, wherein the fit diameter is defined by a radial contact surface for a section of the turbine housing formed on the first flange of the insert piece. By way of this, the containment safety in the region of the turbine can be particularly advantageously provided namely subject to providing cost and weight reductions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

The invention present here relates to a turbine and to a turbocharger. The fundamental construction of a turbine and of a turbocharger according to the prior art has already been described making reference to FIG. 1. In the following, only such details of a turbine according to the invention and of a turbocharger according to the invention, by which the turbine differs from the prior art, will be discussed.

Figure 1:
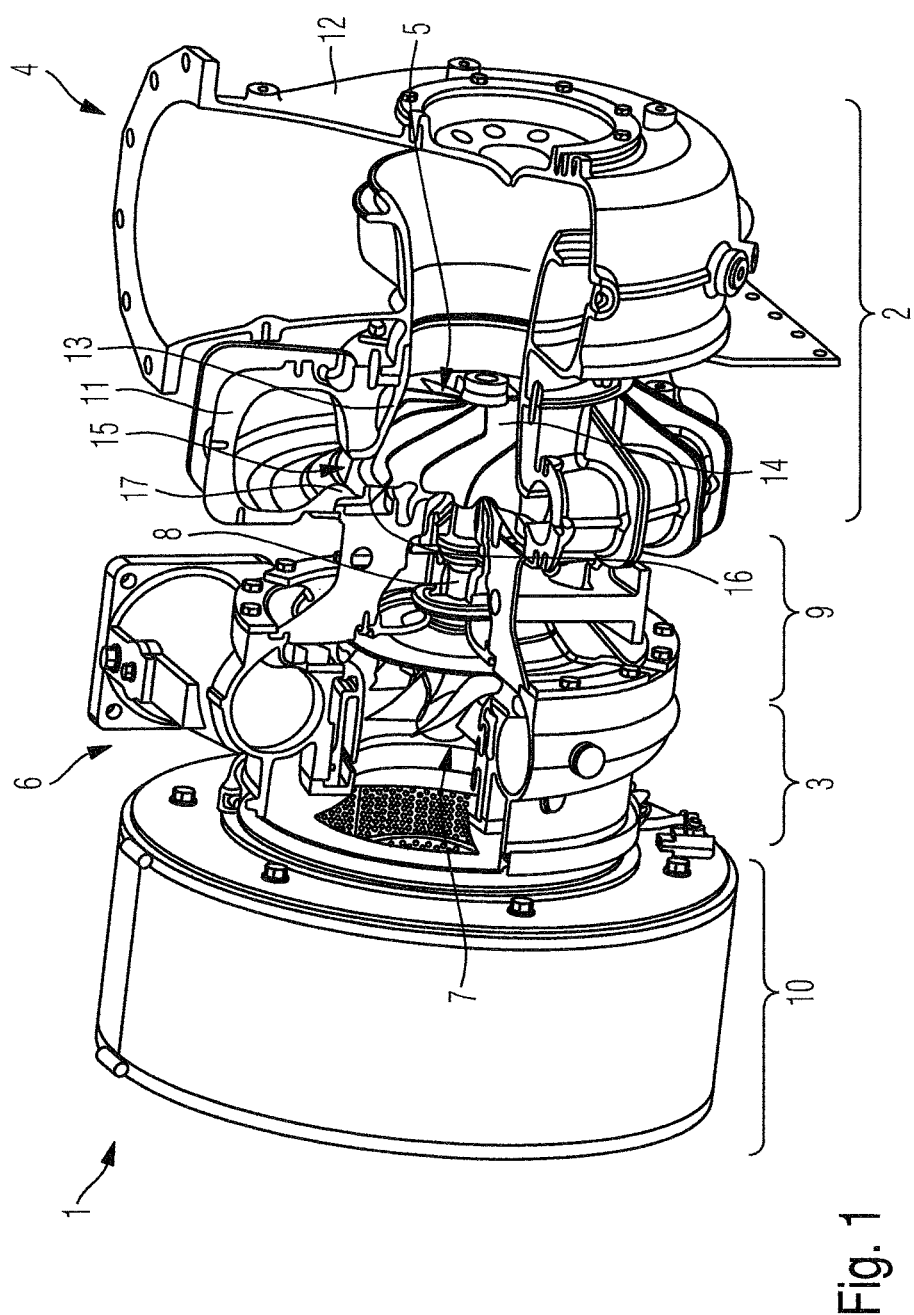
FIG. 1 is a cross section through a turbocharger according to the prior art.
Figure 2:
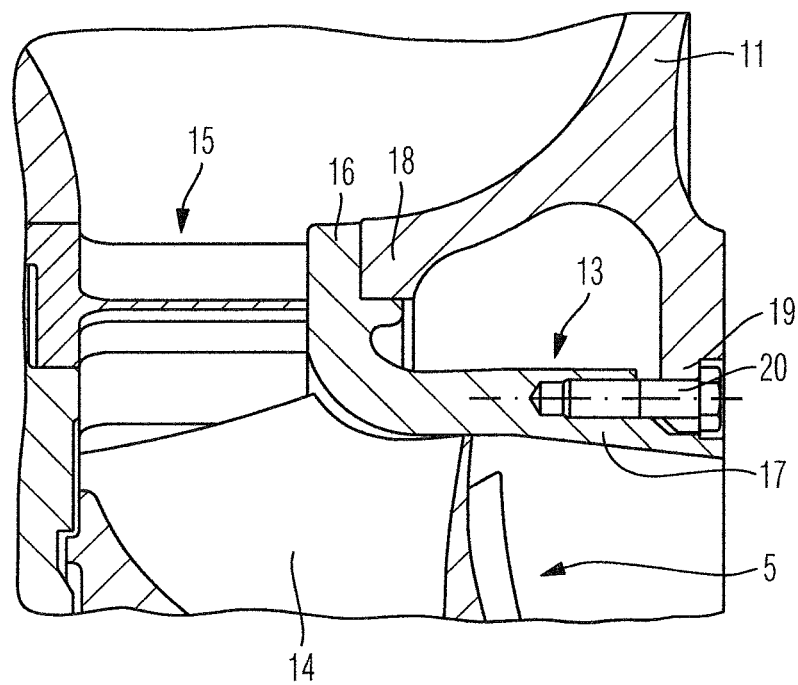
FIG. 2 is a detail of a turbine or a turbocharger.
Figure 3:
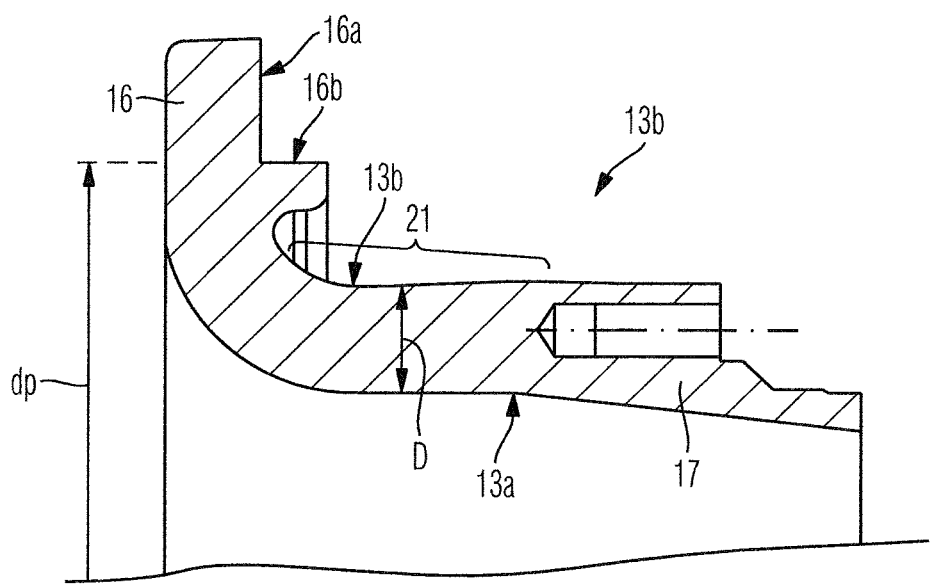
FIG. 3 is a further detail of the turbine or of the turbocharger.

FIGS. 2 and 3 show details of a turbine of a turbocharger according to one aspect of the invention, wherein FIG. 1 shows an extract in the region of the insert piece 13, of the adjoining nozzle ring 15 and of the adjoining inflow housing 11 of the turbine housing 4.

The insert piece 13 extends radially adjoining the moving blades 14 of the turbine rotor 5 and delimits, at least in sections, a flow passage of the turbine 2.

At an upstream end, the insert piece 13 comprises a first flange 16 and at a downstream end, a second flange 17.

At the first flange 18, the insert piece 13 comes to lie against a section 18 of the inflow housing 11 of the turbine housing 4, wherein on this flange 16 on the one hand an axial contact surface 16a and on the other hand a radial contact surface 16b for the section 18 of the inflow housing 11 is formed. The radial contact surface 16*b* in the region of this upstream flange 16 defines a so-called fit diameter $d_P$ of the insert piece 13.

At the downstream end located opposite first flange 16, the second flange 17 of the insert piece 13 is formed, via which the insert piece 17 at the downstream end of the same, interacts with a further section 19 of the inflow housing 11 of the turbine 2. According to FIG. 2, multiple screws 20 extend through this section 19 of the inflow housing 11, which forms a flange, and the second flange 17 of the insert piece 13, which during tightening press the flange 16 at the upstream end of the insert piece 13 against the section 18 of the inflow housing 11, namely in the axial direction with the axial contact surface 16*a*.

Between the first flange 16 at the upstream end and the second flange 17 at the downstream end of the insert piece 13, a middle section 21 of the insert piece 13 is formed. This middle section 21 of the insert piece 13 is characterized by an approximately constant thickness D. This thickness D is defined by the radial distance between a radially inner flow-conducting wall 13*a* of the insert piece 13 and a radially outer wall 13*b* of the insert piece 13.

An approximately constant thickness D of this section 21 of the insert piece 13 means that in the region of the section 21 the thickness D, based on a mean thickness of the middle section 21, changes by maximally ±10%, preferentially by maximally ±7%, particularly preferably by maximally ±5%.

The approximately constant thickness changes particularly preferably by maximally ±2 mm, based on the mean thickness of the middle section 21.

The mean thickness is defined by a mean value of all thicknesses of the middle section 21 along the axial extension of the same.

The mean thickness of the middle section 21 in particular amounts to between 3% and 9%, preferably between 4% and 8%, particularly preferably between 5% and 7% of the fit diameter $d_P$.

The insert piece 13 is preferentially a cast component that is already precast to the final contour. Machining of the insert piece 13 is merely provided in the region of the radially inner flow-conducting wall 13*a*, which is preferentially effected by turning.

With the invention, the kinetic energy of fragments of the turbine rotor 5 can be removed in a defined manner by the insert piece 13 in the event of a failure. Other measures for the containment safety can be embodied simpler, more easily and more cost-effectively because of this. Furthermore, an optimal gap can be adjusted between insert piece 13 and turbine rotor 5. During the operation, there is no risk that the insert piece 13 moves in the direction of the turbine rotor 5 as a consequence of thermal expansions and reduces this gap.

Thus, improved thermal characteristics of the turbocharger are obtained through the defined wall thickness. By way of small and thus flexible wall thicknesses, the load on the components through the thermal expansion are intercepted through elastically flexible deformation. A more favourable flange loading between flange bearing housing/turbine inflow housing and an efficiency increase through optimally smaller gaps through nozzle ring and insert piece are obtained.

A further positive effect of the invention is that a splitting-off of the flange region (flange bearing housing—turbine inflow housing) is prevented in that the wall thickness is not only radially defined but also in the transition region above the radial region. Because of this, the force acting on this flange is held in the defined range.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A turbine for a turbocharger, for expanding a medium, comprising
    a turbine rotor;
    a turbine housing; an insert piece, running radially outside directly adjacent to moving blades of the turbine rotor, wherein the insert piece comprises:
        a first flange at an upstream end;
        a second flange at a downstream end; and
        a middle section, which extends between the first flange and the second flange, having a substantially constant thickness.

2. The turbine according to claim 1, wherein the thickness is defined by a radial distance between a radially inner, flow-conducting wall and a radially outer wall.

3. The turbine according to claim 2, wherein the substantially constant thickness between the first flange and the second flange changes by maximally.+−0.10% based on a mean thickness of the middle section.

4. The turbine according to any one of the claim 2, wherein the substantially constant thickness between the first flange and the second flange changes by maximally.+−0.10 mm based on a mean thickness of the middle section.

5. The turbine according to claim 3, wherein the mean thickness of the middle section is between 3% and 9% of a fit diameter of the insert piece.

6. The turbine according to claim 5, wherein the mean thickness is between 4% and 8% of the fit diameter.

7. The turbine according to claim 6, wherein the mean thickness is between 5% and 7% of the fit diameter.

8. The turbine according to claim 5, wherein the fit diameter is defined by a radial contact surface for a section of the turbine housing formed on the first flange of the insert piece.

9. The turbine according to claim 1, wherein the insert piece is screwed to an inflow housing at the downstream end of the insert piece via screws that extend through a flange of an inflow housing of the turbine housing and the second flange of the insert piece.

10. The turbine according to claim 4, wherein the mean thickness of the middle section amounts to between 3% and 9% of a fit diameter of the insert piece.

11. A turbocharger, comprising:
    a turbine for expanding a first medium comprising:
        a turbine rotor;
        a turbine housing;
        an insert piece, running radially outside directly adjacent to moving blades of the turbine rotor, wherein the insert piece comprises:

a first flange at an upstream end;
a second flange at a downstream end; and
a middle section, which extends between the first flange and the second flange, having a substantially constant thickness; and
a compressor for compressing a second medium.

\* \* \* \* \*